US012798321B2

(12) United States Patent
Gesenhues et al.

(10) Patent No.: US 12,798,321 B2
(45) Date of Patent: Nov. 17, 2026

(54) METHOD FOR ADJUSTING A DAMPING FORCE, AND DAMPING SYSTEM FOR A MOTOR VEHICLE

(71) Applicants: thyssenkrupp Bilstein GmbH, Ennepetal (DE); thyssenkrupp AG, Essen (DE)

(72) Inventors: Ludger Gesenhues, Unna (DE); Klaus Schmidt, Odenthal (DE); Ole Goetz, Braunschweig (DE); Vitali Killert, Edemissen (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 0 days.

(21) Appl. No.: 19/136,192

(22) PCT Filed: Dec. 1, 2023

(86) PCT No.: PCT/EP2023/083897
§ 371 (c)(1),
(2) Date: Jun. 5, 2025

(87) PCT Pub. No.: WO2024/120989
PCT Pub. Date: Jun. 13, 2024

(65) Prior Publication Data

US 2026/0200281 A1 Jul. 16, 2026

(30) Foreign Application Priority Data

Dec. 7, 2022 (DE) ..................... 10 2022 132 492.3
Dec. 7, 2022 (LU) ........................................ 103048

(51) Int. Cl.
*B60G 17/019* (2006.01)
*B60G 17/08* (2006.01)

(52) U.S. Cl.
CPC ........... *B60G 17/019* (2013.01); *B60G 17/08* (2013.01); *B60G 2202/154* (2013.01);
(Continued)

(58) Field of Classification Search
CPC ...... B60G 17/019; B60G 17/08; B60G 17/06; B60G 17/015; B60G 2202/413;
(Continued)

(56) References Cited

U.S. PATENT DOCUMENTS 7,751,959 B2 * 7/2010 Boon .................. B60G 21/073 251/74
9,328,789 B2 * 5/2016 Ogawa .................... B61F 5/245
(Continued)

FOREIGN PATENT DOCUMENTS

CN 105377595 A * 3/2016 ........... B60G 17/056
CN 105620220 A * 6/2016 ......... B60G 17/0525
(Continued)

OTHER PUBLICATIONS

English Translation of International Search Report issued in PCT/EP2023/083897, dated Feb. 27, 2024.

*Primary Examiner* — Keith J Frisby
(74) *Attorney, Agent, or Firm* — hyssenkrupp North America, LLC

(57) ABSTRACT

In a damping system for a motor vehicle including a working cylinder at least partially filled with hydraulic fluid and a pressure adjustment arrangement containing a pump, a hydraulic accumulator, a first valve and a second valve, each of which is connected via hydraulic lines to the first and second working chambers and wherein the valve position of the valves is adjustable, in particular continuously, a method for adjusting a damping force of the damping system includes the valve position of the valves and/or the volumetric flow rate and/or the speed of the pump being con-
(Continued)

trolled/regulated depending on a predetermined force set-point acting on the piston rod. Further, a damping system for a motor vehicle includes a working cylinder at least partially filled with hydraulic fluid and a pressure adjustment arrangement containing a pump, a hydraulic accumulator, a first valve and a second valve, each of which is connected to the first and second working chambers by hydraulic lines, wherein the valves are designed in such a way that the valve position is adjustable, in particular continuously, wherein the damping system has a control/regulation device which is connected to the pump and the valves and is designed in such a way that it controls/regulates the valve position of the valves and/or the volumetric flow rate and/or the speed of the pump depending on a predetermined force set-point acting on the piston rod.

12 Claims, 3 Drawing Sheets

(52) U.S. Cl.

CPC ...... *B60G 2202/24* (2013.01); *B60G 2202/25* (2013.01); *B60G 2202/413* (2013.01); *B60G 2202/416* (2013.01); *B60G 2204/62* (2013.01); *B60G 2400/5182* (2013.01); *B60G 2400/60* (2013.01); *B60G 2500/11* (2013.01); *B60G 2500/114* (2013.01); *B60G 2600/124* (2013.01); *B60G 2600/182* (2013.01)

(58) Field of Classification Search

CPC ........ B60G 2202/414; B60G 2202/415; B60G 2202/416; B60G 2202/24; B60G 2202/154; B60G 2202/25; B60G 2400/60; B60G 2400/5182; B60G 2500/11; B60G 2500/114; B60G 2500/10; B60G 2600/124; B60G 2600/14; B60G 2600/18; B60G 2600/182; B60G 2600/184; B60G 2204/62

USPC ................................ 280/5.5, 124.1, 124.157

See application file for complete search history.

(56) References Cited

U.S. PATENT DOCUMENTS

| | | | | |
|---|---|---|---|---|
| 11,117,435 | B2 * | 9/2021 | Liebold | B60G 13/08 |
| 12,479,259 | B2 * | 11/2025 | Belter | B60G 17/08 |
| 2007/0137913 | A1 * | 6/2007 | Wohanka | B60G 15/12<br>180/197 |
| 2013/0248306 | A1 * | 9/2013 | Ogawa | F15B 21/04<br>188/266.2 |
| 2017/0240017 | A1 | 8/2017 | Vandersmissen et al. | |
| 2018/0154728 | A1 | 6/2018 | Giovanardi et al. | |
| 2019/0047350 | A1 * | 2/2019 | Thomae | B60G 17/08 |
| 2020/0049266 | A1 * | 2/2020 | Tucker | B60G 17/044 |
| 2022/0154798 | A1 * | 5/2022 | Förster | F04B 11/0033 |
| 2022/0161872 | A1 * | 5/2022 | Streit | B62D 33/0608 |

FOREIGN PATENT DOCUMENTS

| | | | | | |
|---|---|---|---|---|---|
| CN | 112440645 | A | * | 3/2021 | B60G 17/08 |
| CN | 113124085 | A | * | 7/2021 | F16F 9/19 |
| CN | 113187843 | A | * | 7/2021 | F15B 11/08 |
| DE | 10 2010 007 237 | A1 | | 9/2010 | |
| DE | 102010023434 | A1 | * | 12/2011 | B60G 13/14 |
| DE | 102010054908 | A1 | * | 6/2012 | B60G 17/0424 |
| DE | 102011100307 | A1 | * | 11/2012 | B60G 17/0416 |
| DE | 10 2017 212 155 | A1 | | 1/2018 | |
| DE | 102018221576 | A1 | * | 6/2020 | B60G 17/018 |
| DE | 10 2019 115 492 | A2 | | 12/2020 | |
| EP | 0424784 | A2 | * | 5/1991 | B60G 21/0555 |
| KR | 20200060949 | A | * | 6/2020 | B60G 13/14 |

* cited by examiner

METHOD FOR ADJUSTING A DAMPING FORCE, AND DAMPING SYSTEM FOR A MOTOR VEHICLE

CROSS REFERENCE TO RELATED APPLICATIONS

This application is a U.S. National Stage Entry of International Patent Application Serial Number PCT/EP2023/083897, filed Dec. 1, 2023, which claims priority to German Patent Application No. DE 10 2022 132 492.3, filed Dec. 7, 2022, and Luxembourg Patent Application LU 103048, filed Dec. 7, 2022 the entire contents of which are incorporated herein by reference.

FIELD

The present disclosure generally relates to a method for adjusting a damping force of a damping system for a motor vehicle, as well as a damping system for a motor vehicle.

BACKGROUND

An active damping system is known from DE102019115492B4. An active damping system is, for example, a damping system with a pump by means of which the pressure in the cylinder chambers can be actively influenced. Active damping systems known from the prior art often have a large number of hydraulic components and sensors to enable targeted adjustment of the pressure and the desired damping effect. This is usually associated with high manufacturing and maintenance costs.

Thus a need exists to provide a damping system which enables active damping, and which is inexpensive and easy to manufacture.

DETAILED DESCRIPTION

Figure 1:
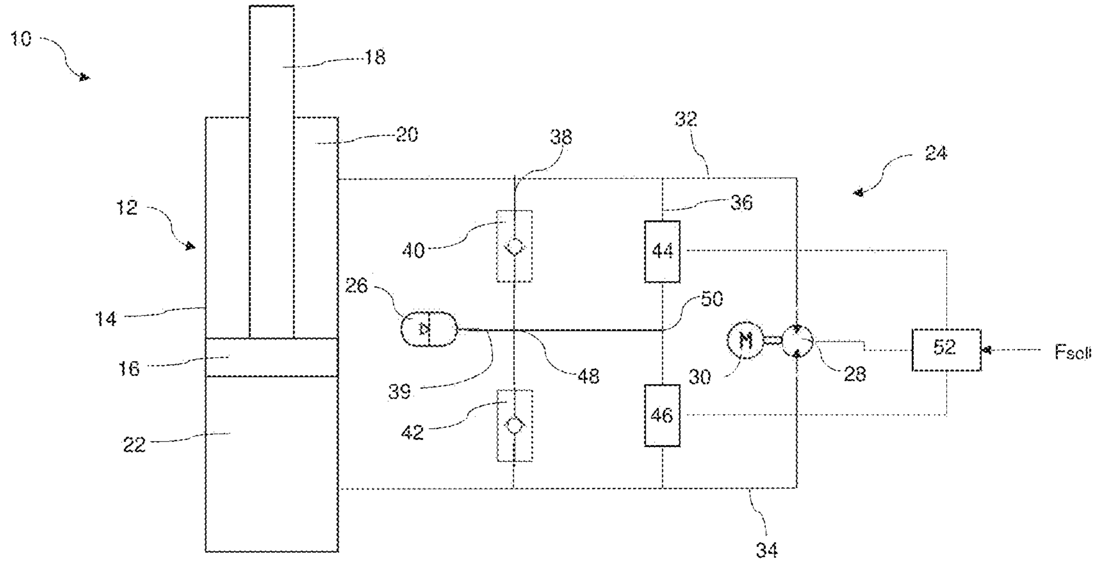
FIG. 1 shows a schematic representation of a damping system according to an exemplary embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect, the invention includes a method for adjusting a damping force of a damping system for a motor vehicle, wherein the damping system has:

- a working cylinder at least partially filled with hydraulic fluid and a working piston with a piston rod arranged and axially movable within the working cylinder, wherein the working piston divides the working cylinder into a first working chamber and a second working chamber, and
- a pressure adjustment arrangement for adjusting the pressure in the first and second working chambers, wherein the pressure adjustment arrangement contains a pump, a hydraulic accumulator, a first valve and a second valve, each connected to the first and second working compartments by hydraulic lines, and
- wherein the valve position of the valves is adjustable, in particular continuously.

The method includes the control/regulation of the valve position of the valves and/or the volumetric flow rate and/or the speed of the pump depending on a predetermined force setpoint $F_{soll}$ acting on the piston rod.

The damping system preferably contains a vibration damper with the working cylinder and the working piston. The vibration damper is, for example, a monotube vibration damper or a multi-tube vibration damper. For example, a vibration damper, in particular a multi-tube vibration damper, for a vehicle contains, for example, an outer tube and an inner tube, in particular the working cylinder, arranged coaxially to it with a compensation chamber for accommodating hydraulic fluid between the outer tube and the inner tube, and a working piston connected to a piston rod, which is arranged movably back and forth within the inner tube, wherein the interior of the inner tube is divided by the working piston into a first working chamber and a second working chamber.

The vibration damper, for example, is a multi-tube vibration damper, wherein the compensation chamber is partially filled with a gas, especially at the upper end. Within the compensation chamber, a central tube is preferably coaxially attached to the inner tube and the outer tube and is attached in particular to the inner tube. The compensation chamber is in particular in the form of an annular chamber and is bounded by the outer tube and the central tube or the inner tube. The outer tube preferably forms at least part of the housing of the vibration damper. The inner surface of the inner tube is preferably designed as a guide for the working piston. The working piston preferably has a valve device by which the first and second working chambers are connected to each other. Optionally, the multi-tube vibration damper is designed without a central tube and with an external gas chamber.

In particular, the vibration damper has a closure package that is designed and arranged to fluidically seal the interior of the outer tube on the piston rod side. The piston rod side end of the inner tube is preferably attached to the closure package. Opposite the closure package, at the end remote from the piston rod, the interior of the outer tube is preferably fluidically sealed by means of a bottom piece. A bottom valve which is optionally arranged on the bottom piece is attached in particular to the end of the inner tube remote from the piston rod. The second working chamber is preferably fluidically connected to the compensation chamber via the bottom valve. The bottom valve is preferably a check valve that can pass flow in both directions or only one direction. For example, the bottom valve is in the form of a check valve in the rebound direction, when the piston moves out of the inner tube, and in the form of a characteristic valve in the pressure direction, when the piston moves into the inner tube.

The pressure adjustment arrangement is preferably designed in such a way that it adjusts the pressure within the working chambers, in particular the force acting on the working piston. In particular, the pressure adjustment arrangement is designed to adjust the damping force of the damping system.

The pump is preferably a bidirectional hydraulic pump with at least two connections for respective connection to a hydraulic line, wherein the connections can each be operated as an inlet or outlet of the hydraulic pump. Preferably, the direction of rotation of the pump is reversible, so that it can be operated in both directions in suction or pressure mode. The hydraulic accumulator, for example, is a particularly pressurized accumulator and filled with hydraulic fluid and gas. The pump is preferably connected to a motor, especially an electric motor, for driving the pump.

The valves are preferably continuously adjustable valves, especially solenoid valves.

Preferably, the hydraulic resistance of the valves is adjustable. The valve position is to be understood in particular as the position of an adjusting gate of the valve that opens or closes a flow channel so that the hydraulic resistance changes with different valve positions. Preferably, the valves each have a solenoid coil that can be supplied with current and that influences the position of the adjusting gate and thus the valve position.

The force setpoint $F_{soll}$ is a force value that can be specified manually or automatically, which represents the setpoint force acting on the piston rod, in particular the damping force. For example, the force setpoint $F_{soll}$ is calculated from predefined data, such as the pressure within the working chambers. The force setpoint is calculated, for example, depending on vehicle data determined by sensors and/or specified. The vehicle data are, for example, the acceleration or speed of the vehicle.

Adjusting the valve position of the valves and/or the volumetric flow rate and/or the speed of the pump depending on the specified force setpoint $F_{soll}$ offers the advantage of a simple, especially model-based, adjustment of the valves and the pump, wherein the measurement of the pressure by pressure sensors, especially in the inlets and outlets of the pump, can be dispensed with.

The pressure adjustment arrangement preferably includes a plurality of hydraulic lines for connecting the pump and the hydraulic accumulator to the valves and the first working chamber and the second working chamber of the vibration damper. The pressure adjustment arrangement preferably contains at least two check valves. For example, the check valves are connected in series to each other and parallel to the valves, the pump, and/or the hydraulic accumulator.

The pump is preferably connected to the first working chamber of the vibration damper via a hydraulic line and, in particular, to the second working chamber of the vibration damper via another hydraulic line. In particular, the valves are connected in series to each other and are connected to the pump via a hydraulic line, wherein the valves are in particular connected parallel to the pump. For example, the valves are designed in such a way that they can only pass flow through in one direction. Preferably, flow can pass through one valve in the pressure stage and can flow through the other valve in the rebound stage. In this case, the valves are each preferably connected in series with a respective one of the check valves.

The hydraulic accumulator is preferably connected to the two check valves via a hydraulic line in such a way that the connecting node of the hydraulic lines is arranged between the two check valves. The hydraulic accumulator is preferably additionally connected to the two valves via the hydraulic line in such a way that the connecting node of the hydraulic lines is arranged between the two valves.

The pressure adjustment arrangement is preferably designed to influence the damping characteristic of the vibration damper and is connected to it. The pressure adjustment arrangement is preferably designed in such a way that it allows active or passive damping of the vibration damper. In the case of passive damping, it is preferable that no additional pressure is applied to the vibration damper via the pump and/or the hydraulic accumulator, whereas in the case of active damping, pressure is increased in at least one working chamber via the pump and/or the hydraulic accumulator.

The force setpoint $F_{soll}$ is a set value for the force acting on the piston rod, in particular the force acting on the piston rod by means of the hydraulic pressure. The force setpoint is therefore the force value that is to act on the piston rod, in particular the desired force.

According to a first embodiment, the force $F_{ist}$ actually acting on the piston rod is determined. Subsequently, a force deviation $\Delta F$ between the force setpoint $F_{soll}$ and the actual force $F_{ist}$ is preferably determined and the valve position of the valves and/or the volumetric flow rate and/or the speed of the pump is adjusted, in particular controlled/regulated, depending on the determined force deviation $\Delta F$. The determination of the actual force $F_{ist}$ acting on the piston rod is preferably carried out based on a model, preferably by means of a predetermined model. For this purpose, a required pressure in the respective working chambers is preferably determined from the force deviation $\Delta F$ and the valve positions of the valves and/or the speed or volumetric flow rate of the pump are adjusted in such a way that the respective required pressure is reached. For example, the volumetric flow rate or the speed of the pump and/or the current or voltage to the pump and/or the valves is increased or decreased depending on the force deviation $\Delta F$. Preferably, the volumetric flow rate or speed of the pump is increased if the force setpoint $F_{soll}$ is greater than the actual force value $F_{ist}$.

According to another embodiment, the valve position and/or the voltage and/or current applied to the valves are determined by means of a sensor SV or specified, for example, and the force $F_{ist}$ actually acting on the piston rod is determined from this. The valve position and/or the voltage and/or current applied to the valves is specified manually or automatically by means of a controller/regulator, for example. The determination of the force $F_{ist}$ is preferably model based. The force $F_{ist}$ is preferably not calculated using pressure values obtained from a pressure sensor. The sensor SV is preferably designed in such a way that it measures the valve position or determines it from measured values, such as current or voltage. The sensor SV is preferably designed in such a way that it determines the current and/or voltage at the valves and optionally calculates a valve position from this. For the purposes of this application, a sensor is also to be understood as a device for the indirect determination of the voltage, current and/or valve position.

According to another embodiment, the voltage, current applied to the pump, the volumetric flow rate and/or the speed of the pump is determined by means of a sensor SP and from this the actual force $F_{ist}$ acting on the piston rod is determined. The determination of the force $F_{ist}$ is preferably model based. For the purposes of this application, a sensor is also to be understood as an apparatus for the indirect determination of the voltage, current, volumetric flow rate and/or speed of the pump.

According to another embodiment, the actual force $F_{ist}$ acting on the piston rod is determined in a model-based way by means of a predetermined pump model that includes the pump pressure over the working range of the pump. In particular, a mathematical pump model is determined for this purpose in advance and is stored in the damping device, preferably a control/regulation device. The pump model preferably assigns a determined pump pressure and/or a force $F_{ist}$ acting on the piston rod to the values determined by the sensors SV or SP. The mathematical pump model is preferably a mathematical model obtained by means of a series of tests carried out on a test bench and subsequent validation to represent the performance and working range of the pump. For this purpose, for example, the pump pressure, the volumetric flow rate, the speed, the voltage, the current consumption of the pump and/or the force applied to the piston rod are measured by means of corresponding sensors over the working range of the pump and a mathematical model is created from this, which assigns a corresponding pump pressure or force value $F_{ist}$ to the values that can be determined by the sensors SV and SP. The pump model is preferably a dynamic pump model that can be adapted during the operation of the damping system.

By creating a pump model, pressure sensors for determining the pump pressure by means of pressure sensors can be dispensed with, which makes the damping system more cost-effective to manufacture and requires less maintenance.

According to another embodiment, the pump model is continuously monitored and corrected. Preferably, a correction factor is determined during the operation of the damping system. In particular, the correction factor is applied to the pump model during the operation of the damping system to adapt the pump model to different ambient conditions, for example, and in particular to compensate for deviations between the model and reality. Preferably, the correction factor is taken into account when determining the actual force value $F_{ist}$ by means of the pump model.

According to another embodiment, a sensor SF is used to determine the acceleration and/or level of the vibration damper and/or the absolute acceleration of the vehicle and/or the wheel acceleration or data from the IMU (inertial measurement unit) and the correction factor $\mu$ for the correction of the pump model is calculated from the values determined by the sensor SF. The sensor SF is attached, for example, to the body of a motor vehicle and/or a vehicle wheel, especially the axle. Preferably, a value for the acceleration and/or the level of the vibration damper and/or the absolute acceleration of the vehicle is determined from the determined actual force value $F_{ist}$. In particular, the calculated acceleration and/or the level and/or the absolute acceleration of the vehicle and the data measured by the sensor SF are then compared and, for example, a respective deviation is calculated. Preferably, a correction factor $\mu$ for correcting the pump model is determined from the respective deviation. The correction factor is transmitted to the pump model, wherein the pump model is preferably corrected by means of the correction factor. Subsequently, in particular, an actual force value $F_{ist}$ is calculated, which takes into account the correction factor determined by the pump model.

The invention also contains a damping system for a motor vehicle containing a working cylinder at least partially filled with hydraulic fluid, a working piston arranged and axially movable within the working cylinder with a piston rod, wherein the working piston divides the working cylinder into a first working chamber and a second working chamber, and a pressure adjustment arrangement for adjusting the pressure in the first and second working chambers, wherein the pressure adjustment arrangement contains a pump, a hydraulic accumulator, a first valve and a second valve, each connected by hydraulic lines to the first and second working chambers, and wherein the valves are designed in such a way that the valve position is adjustable, in particular continuously. The damping system has a control/regulation device which is connected to the pump and the valves, and which is designed in such a way that it adjusts, in particular controls/regulates the valve position of the valves and/or the volumetric flow rate and/or the speed of the pump depending on a predetermined force setpoint $F_{soll}$ acting on the piston rod.

The embodiments, features and advantages described above with reference to the method also apply to the damping system in device terms.

The control/regulation device is preferably connected to the pump, especially the motor, and the first and second valves for control/regulation and data transmission. In particular, the control/regulation device is connected to the sensors SF, SV, and SP for transmitting data.

According to one embodiment, the control/regulation device is designed to determine the actual force $F_{ist}$ acting on the piston rod, wherein the control/regulation device is designed to determine a force deviation $\Delta F$ between the force setpoint $F_{soll}$ and the force $F_{ist}$ and to control/regulate the valve position of the valves and/or the volumetric flow rate and/or the speed of the pump depending on the determined force deviation $\Delta F$.

According to another embodiment, the pressure adjustment arrangement has at least one sensor SV for determining or a controller for specifying the valve position and/or the voltage and/or current applied to the valves, wherein the sensor SV or the controller is connected to the control/regulation device and this is designed to determine the force $F_{ist}$ actually acting on the piston rod from the data determined by the sensor SV or specified by the control system.

According to another embodiment, the pressure adjustment arrangement has a sensor SP for determining the voltage, current applied to the pump, the volumetric flow rate and/or speed of the pump and wherein the sensor SP is connected to the control/regulation device, and this is designed to determine the force $F_{ist}$ actually acting on the piston rod from the data determined by the sensor SP.

According to another embodiment, the control/regulation device has a pump model that includes the pump pressure over the working range of the pump and wherein the control/regulation device is designed in such a way as to determine the force $F_{ist}$ actually acting on the piston rod from the pump model. Preferably, the predetermined pump model is stored in the control/regulation device.

According to another embodiment, the pressure adjustment arrangement has a sensor SF for determining the acceleration and/or the level of the vibration damper, which is connected to the control/regulation device and wherein the control/regulation device is designed in such a way that it calculates a correction factor for the correction of the pump model from the values determined by the sensor SF.

The invention also includes a motor vehicle with a chassis and a damping system attached to it as described above. Preferably, the sensors SF for determining the acceleration and/or the level of the vibration damper and/or the wheel acceleration and/or IMU data sensors, such as navigation data sensors, are attached to the chassis of the motor vehicle.

The invention also includes a computer program product for controlling the method described above for adjusting a damping force of a damping system for a motor vehicle.

FIG. 1 shows a damping system 10 for a motor vehicle. In particular, such a damping system is attached to a chassis of a motor vehicle that is not shown here. The damping system 10 contains, for example, a vibration damper 12, in particular a monotube vibration damper, with a working cylinder 12. A working piston 16 that is arranged within the working cylinder 12 is preferably mounted to be movable in the axial direction of the working cylinder 14. A piston rod 18 that is attached to the working piston 16 extends in the axial direction through and out of the working cylinder 14. The working piston 16 is preferably hydraulically sealed within the working cylinder 14 and divides the working cylinder 14 into a first working chamber 20 on the piston rod side and a second working chamber 22 on the side remote from the piston rod. The working piston 16 preferably contains a valve arrangement, in particular for limiting a maximum pressure difference between the two working chambers 20, 22. The vibration damper can also be a multi-tube vibration damper.

The damping system 10 also contains a pressure adjustment arrangement 24 for adjusting the damping force acting on the piston rod, in particular for adjusting the pressure within the first working chamber 20 and the second working chamber 22. The pressure adjustment arrangement 24 contains, for example, a hydraulic accumulator 26 and a pump 28. The pump 28 is preferably connected to a motor 30, especially an electric motor. The pump 28 is preferably a bidirectional hydraulic pump with at least two connections for connection to a respective hydraulic line, wherein the connections can each be operated as an inlet or outlet of the hydraulic pump. The pressure adjustment arrangement 24 contains a plurality of hydraulic lines 32 to 38 for connecting the pump 28 and hydraulic accumulator 26 to the first working chamber 22 and the second working chamber 24 of the vibration damper 20. The pressure adjustment arrangement 24 preferably contains at least two check valves 40, 42. Furthermore, the pressure adjustment arrangement 24 includes in particular at least two valves, a first valve 44 and a second valve 46, wherein the hydraulic resistance of the valves 44, 46 is adjustable, in particular continuously. Optionally, the valves 44, 46 are designed to pass flow through exclusively in one direction. For example, the valves 44, 46 are solenoid valves that can pass flow through in one direction. In particular, the first valve 44 can only pass flow through in the rebound stage and the second valve 46 exclusively in the pressure stage.

By way of example, the pump 28 is connected to the first working chamber 20 of the vibration damper 12 by a first hydraulic line 32 and in particular to the second working chamber 22 of the vibration damper 12 by a second hydraulic line 34. The valves 44, 46 are connected in series to each other and are connected by a third hydraulic line 36 to the first and second hydraulic lines 32, 34, wherein the valves 44, 46 are connected parallel to the pump 28. The check valves 40, 42 are connected in series to each other and are connected to the first and second hydraulic lines 32, 34 via a fourth hydraulic line 38, wherein the check valves 40, 42 are connected parallel to the valves 44, 46 and the pump 28.

The hydraulic accumulator 26 is connected to the third and fourth hydraulic lines 36, 38 by a fifth hydraulic line 39, wherein the first hydraulic connecting node 48 for the connection of the fifth hydraulic line 39 to the fourth hydraulic line 38 is arranged between the two check valves 40, 42. The second connecting node 50 for the connection of the fifth hydraulic line 39 to the third hydraulic line 36 is arranged between the two valves 44, 46, for example, so that the hydraulic accumulator 26 is connected to the valves 44, 46 in particular via the first and second connecting nodes 48, 50. The valves 44, 46, for example, are continuously adjustable valves, such as solenoid valves. The pressure adjustment arrangement 24 is preferably connected to the vibration damper 12 to influence the damping characteristic thereof. The pressure adjustment arrangement 24 is preferably designed in such a way that it allows active, semi-active or passive damping of the vibration damper 12. In the case of passive damping, it is preferable that no additional pressure is transferred to the vibration damper 12 by the pump 28 and/or the hydraulic accumulator 26. Furthermore, the valves 44, 46 preferably have a constant, unchangeable valve position in the case of passive damping. In the case of semi-active damping, it is preferable that no additional pressure is transferred to the vibration damper 12 via the pump 28 and/or the hydraulic accumulator 26, wherein the valve position of the valves 44, 46 can be changed. In the case of active damping, an increase in pressure is achieved in at least one working chamber 20, 22 via the pump 28 and/or the hydraulic accumulator 26, wherein the valve positions of the valves 44, 46 are adjustable.

Passive or semi-active damping is carried out with the damping system 10 of FIG. 1, for example when the working piston is retracted (pressure stage) in such a way that the second working chamber 22 is hydraulically connected to the first working chamber 20 via the valves 44, 46 and the check valve 40. Preferably, the hydraulic fluid flows from the second working chamber 22 into the second hydraulic line 34 and then into the third hydraulic line 36 via the valves 44, 46. After the valves, the hydraulic fluid flows into the first hydraulic line 32 and into the first working chamber 20. A partial flow is diverted via the second connecting node 50 between the two valves 44, 46 and flows via the fifth hydraulic line 39 and the first connecting node 48 and the check valve 40 into the first hydraulic line 32. In passive or semi-active damping, the damping characteristic is preferably adjusted by adjusting the flow resistance of the valves 44, 46.

In the case of passive damping and an extension movement of the working piston (rebound stage), the first working chamber 20 is hydraulically connected to the second working chamber 22 via the valves 44, 46 and the check valve 42. Preferably, the hydraulic fluid flows from the first working chamber 20 into the first hydraulic line 32 and then in the third hydraulic line 36 via the valves 44, 46. After the valves, the hydraulic fluid flows into the second hydraulic line 34 and into the second working chamber 22. A partial flow is diverted via the second connecting node 50 between the two valves 44, 46 and flows via the fifth hydraulic line 39 and the first connecting node 48 and the check valve 42 into the second hydraulic line 34.

In the case of active damping, for example, a pressure increase occurs in one of the working chambers 20, 22, in particular without a movement of the working piston 16 within the working cylinder 14. Preferably, in the case of active damping or activation of the damper, a further increase in pressure in the working chambers 20, 22 in addition to the increase in pressure caused by the movement of the working piston 16 is carried out by means of the pump 28 and the hydraulic accumulator 26. The pump 28 is preferably designed in such a way that it can be operated towards the first hydraulic line 32 or the second hydraulic line 34. When operating towards the first hydraulic line 32, it is connected to the fluid outlet of the pump 28. In particular, if the direction of rotation of the pump is changed, it can be operated in the other direction, for example towards the second hydraulic line 34, so that the first hydraulic line 32 is connected to the fluid inlet and the second hydraulic line 34 is connected to the fluid outlet of the pump 28.

Active damping to increase the pressure within the first working chamber 20 is preferably carried out when the pump 28 is operated towards the first hydraulic line 32. In addition, the hydraulic accumulator 26 is preferably connected to the pump 28, wherein the hydraulic fluid flows from the hydraulic accumulator 26 into the fourth hydraulic line 38 via the check valve 42 into the second hydraulic line 34. From the second hydraulic line 34, the hydraulic fluid preferably flows into the fluid inlet of the pump 28 and then into the first hydraulic line 32. The hydraulic fluid introduced into the first hydraulic line 32 via the hydraulic accumulator 26 and also via the pump 28 ensures an increase in pressure within the first hydraulic line 32. A partial flow is returned from the first hydraulic line 32 via the third hydraulic line 36 and the first valve 44 to the hydraulic accumulator 26, wherein the remaining partial flow is fed to the first working chamber 20 via the first hydraulic line 32 and generates an increase in pressure.

Active damping to increase the pressure within the second working chamber 22 is preferably carried out when the pump 28 is operated towards the second hydraulic line 34. In addition, the hydraulic accumulator 26 is preferably connected to the pump 28, wherein the hydraulic fluid flows from the hydraulic accumulator 26 into the fourth hydraulic line 38 via the check valve 40 into the first hydraulic line 32. From the first hydraulic line 32, the hydraulic fluid flows preferably into the fluid inlet of the pump 28 and then into the second hydraulic line 34. The hydraulic fluid introduced into the second hydraulic line 34 by means of the hydraulic accumulator 26 and also via the pump 28 ensures an increase in pressure within the second hydraulic line 34. A partial flow is returned from the second hydraulic line 34 via the third hydraulic line 36 and the second valve 46 to the hydraulic accumulator 26, wherein the remaining partial flow is fed to the second working chamber 22 via the second hydraulic line 34 and generates an increase in pressure.

The damping system 10 preferably contains a control/regulation device 52. The control/regulation device 52 is connected to the pump 28, in particular the motor 30, and the first and second valves 44, 46 for the purpose of control/regulation and the transmission of data.

In particular, the control/regulation device 52 is designed and set up in such a way that it controls/regulates the valve position of the valves 44, 46 and/or the volumetric flow rate of the pump 28 depending on a predetermined force setpoint acting on the piston rod 18.

Figure 2:
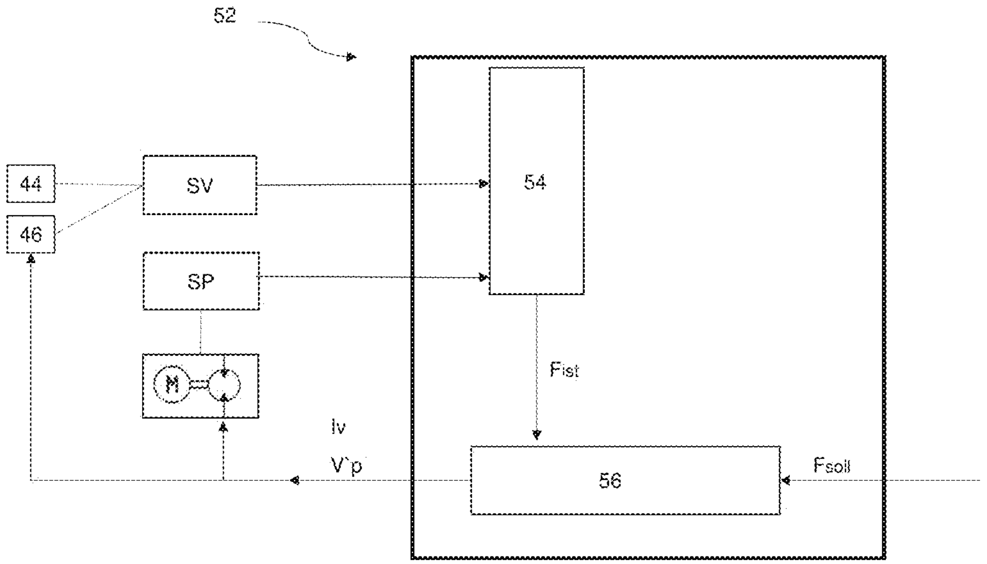
FIG. 2 shows a schematic representation of a control/regulation device according to an exemplary embodiment.

FIG. 2 shows a schematic representation of the control/regulation device 52 for the adjustment of a damping force, in particular a damping characteristic of the damping system of FIG. 1. An example is the control/regulation device 52. The control/regulation device 52 contains, by way of example, a first computing device 54 for the calculation of an actual value for the force applied to the piston rod 18 and/or the working piston 16. Furthermore, the control/regulation device 52 preferably contains a second computing device 56 for calculating the required valve position of the valves 44, 46 and/or the required volumetric flow rate of the pump 28 depending on a manually or automatically assigned force setpoint Fsoll. In particular, the second computing device 56 is designed in such a way that it determines the required current and/or the voltage applied to the valves and/or the pump and/or the required volumetric flow rate or the speed of the pump 28 depending on a manually or automatically assigned force setpoint Fsoll.

Preferably, the damping system 10, in particular the pressure adjustment arrangement 24, has sensors SV, SP for the determination, in particular measurement, of the valve positions and/or the voltage and/or current applied to the valves 44, 46 and/or the pump and/or the volumetric flow rate of the pump 28. In particular, the sensor SV is designed to determine/measure the valve positions and/or the voltage and/or current applied to the valves, wherein the sensor SP is designed to determine the voltage, current applied to the pump 28, the volumetric flow rate and/or the speed of the pump 28. The sensors SV, SP are preferably connected to the control/regulation device 52 for the transmission of data. It is also conceivable that the valve positions and/or the voltage and/or current applied to the valves are not measured by a sensor SV, but are specified by a controller, for example. The values specified by the controller are preferably transmitted to the control/regulation device 52, in particular to the first computing device 54.

The values determined by the sensors SV, SP, such as the speed, the volumetric flow rate, the current and/or the voltage of the pump or the valve positions, the voltage and/or current of the valves 44, 46, are transmitted to the control/regulation device 52, in particular the first computing device 54.

The first computing device 54 is preferably designed and set up in such a way that it determines/calculates the pressure generated by the pump 28 and/or the force $F_{ist}$ actually acting on the piston rod 18 from the values determined by the sensors SV and SP or specified to the controller. In particular, for this purpose a mathematical pump model is stored in computing device 54 which assigns a specific pump pressure and/or force $F_{ist}$ acting on the piston rod 28 to the values determined by the sensors. The mathematical pump model is preferably a mathematical model obtained by means of a series of tests carried out on a test rig and subsequent validation to represent the performance and working range of the pump 28. For this purpose, for example, the pump pressure and/or the force applied to the piston rod 18 are measured by appropriate sensors over the working range of the pump and assigned to each other using a mathematical model with the values that can be determined by the sensors SV and SP.

The control/regulation device 52, in particular the second computing device 56, is preferably designed in such a way that a force setpoint $F_{soll}$ for the force acting on the piston rod 18 can be assigned to the second computing device 56. Preferably, the second computing device 56 is designed and set up in such a way as to increase or decrease the volumetric flow rate or speed of the pump 28 and/or the current or voltage at the pump and/or the valves 44, 46 depending on the force setpoint $F_{soll}$. In particular, the second computing device 56 is designed and set up in such a way that it compares the force setpoint $F_{soll}$ and the actual force value $F_{ist}$ determined by the first computing device 54 and determines a force deviation ΔF from this, for example. For example, the second computing device 56 is designed and set up in such a way as to increase or decrease the volumetric flow rate or speed of the pump 28 and/or the current or voltage at the pump and/or the valves 44, 46 depending on the determined force deviation ΔF. Preferably, the volumetric flow rate or speed of the pump 28 is increased if the force setpoint $F_{soll}$ is greater than the actual force value $F_{ist}$.

Preferably, the second computing device 56 is designed and set up in such a way that it adjusts the valve position of the valves 44, 46 depending on the determined force deviation ΔF. For this purpose, a required pressure in the respective working chambers 20, 22 of FIG. 1 is determined from the force deviation ΔF, preferably with the control/regulation device 52, and the valve positions of the valves 44, 46 and/or the speed or volumetric flow rate of the pump 28 are adjusted by means of the control/regulation device 52 in such a way that the required pressure is reached in each case.

The damping system 10, especially the pressure adjustment arrangement 24, preferably does not have a pressure sensor for measuring the pump pressure.

Figure 3:
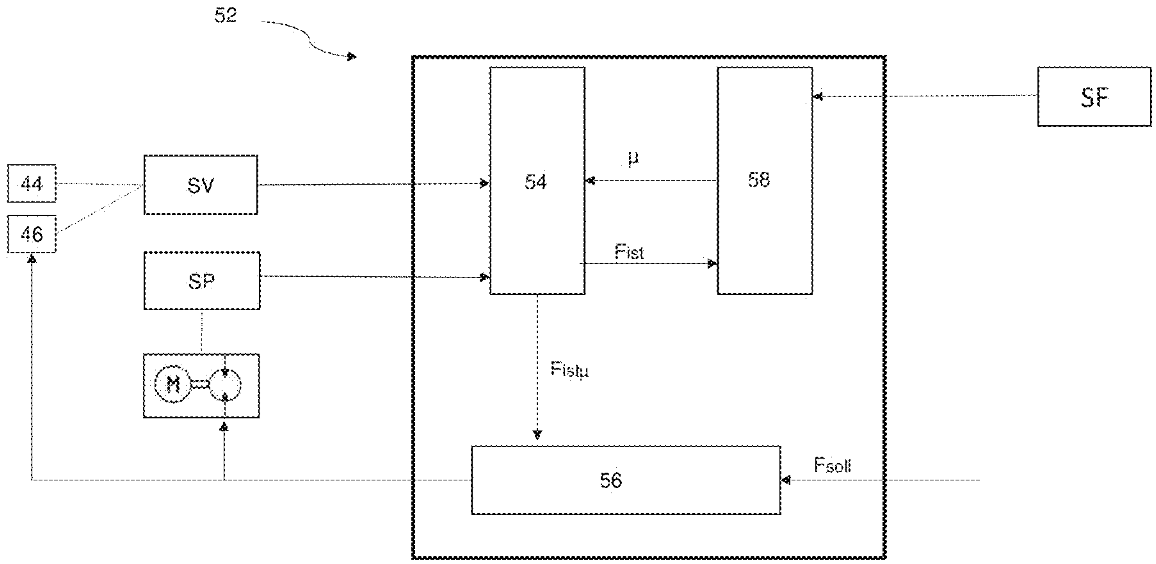
FIG. 3 shows a schematic representation of a control/regulation device according to another exemplary embodiment.

FIG. 3 shows a further exemplary embodiment of a control/regulation device 52 for the adjustment of a damping force, in particular a damping characteristic of the damping system of FIG. 1. The control/regulation device 52 of FIG. 3 corresponds for the most part to the control/regulation device 52 of FIG. 2 with the difference that the control/regulation device 52 of FIG. 3 also has a third computing device 58. The damping device 10, in particular the pressure adjustment arrangement 24, preferably contains a sensor SF for determining, for example, the acceleration and/or the level of the vibration damper 12.

The sensor SF is attached to the body of a motor vehicle, for example. The third computing device 58 is preferably connected to the first and/or the second computing device 54, 56 for the transmission of data. In particular, the second computing device 56 transmits the determined actual force value $F_{ist}$ to the third computing device 58, which is preferably designed in such a way that it determines a value for the acceleration and/or the level of the vibration damper 12 from the actual force value $F_{ist}$.

Preferably, the third computing device 58 is designed in such a way that it compares the determined acceleration and/or the determined level with the acceleration and the level measured by the sensor SF and, for example, calculates a respective deviation. Preferably, a correction factor μ for the correction of the pump model is determined from the respective deviation by means of the computing device 58. The correction factor is transmitted to the first computing device 54, in particular the pump model, wherein the first computing device 54 is designed in such a way as to correct the pump model by means of the correction factor, in particular to adjust it. By means of the first computing device 54, an actual force value $F_{ist\mu}$ is then calculated, which takes into account the determined correction factor μ of the pump model.

The correction factor takes into account a deviation of the pump model from reality, for example due to external influences such as ambient conditions, temperature, or wear.

The pump model is preferably continuously monitored and corrected by means of the control/regulation device 52, in particular the first and third computing devices 54, 58.

LIST OF REFERENCE SIGNS

10 damping system
12 vibration damper
14 working cylinder
16 working piston
18 piston rod
20 first working chamber
22 second working chamber
24 pressure adjustment arrangement
26 hydraulic accumulator
28 pump
30 motor
32 first hydraulic line
34 second hydraulic line
36 third hydraulic line
38 fourth hydraulic line
39 fifth hydraulic line
40 check valve
42 check valve
44 first valve
46 second valve
48 first connection node
50 second connection node
52 control/regulation device
54 first computing device
56 second computing device
58 third computing device
SV sensor (valve)
SP sensor (pump)
SF sensor (vehicle)
μcorrection factor

The invention claimed is:

1. A method for adjusting a damping force of a damping system for a motor vehicle, wherein the damping system includes a working cylinder at least partially filled with hydraulic fluid, a working piston arranged and axially movable within the working cylinder with a piston rod, wherein the working piston divides the working cylinder into a first working chamber and a second working chamber, and a pressure adjustment arrangement for adjusting pressure in the first and second working chambers, wherein the pressure adjustment arrangement contains a pump, a hydraulic accumulator, a first valve and a second valve, each of which is connected to the first and second working chambers by hydraulic lines, wherein valve positions of the valves are adjustable, the method comprising:

controlling/regulating the valve positions of the valves and/or volumetric flow rate and/or speed of the pump depending on a predetermined force setpoint acting on the piston rod;

determining a force actually acting on the piston rod;

determining a force deviation between the force setpoint and the force actually acting on the piston rod;

controlling/regulating the valve positions of the valves and/or the volumetric flow rate and/or the speed of the pump depending on the determined force deviation; and specifying or determining by a sensor the valve positions and/or voltage and/or current applied to the valves and from this determining the force actually acting on the piston rod.

2. The method as claimed in claim 1, wherein the voltage, current applied to the pump, the volumetric flow rate and/or speed of the pump is determined by at least one sensor and from this the force actually acting on the piston rod is determined.

3. The method as claimed in claim 1, wherein the determination of the force actually acting on the piston rod is carried out on a model basis by a predetermined pump model including a pump pressure over a working range of the pump.

4. The method as claimed in claim 3, wherein the pump model is continuously monitored and corrected.

5. The method as claimed in claim 3, wherein an acceleration and/or level of a vibration damper is determined by a sensor and a correction factor for correction of the pump model is calculated from values determined by the sensor.

6. The method as claimed in claim 1, wherein the valve positions of the valves are continuously adjustable.

7. A damping system for a motor vehicle, comprising:

a working cylinder at least partially filled with hydraulic fluid;

a working piston arranged and axially movable within the working cylinder with a piston rod, wherein the working piston divides the working cylinder into a first working chamber and a second working chamber; and a pressure adjustment arrangement for adjusting the pressure in the first and second working chambers;

wherein the pressure adjustment arrangement contains a pump, a hydraulic accumulator, a first valve and a second valve, each of which is connected to the first and second working chambers by hydraulic lines;

wherein the valves are designed in such a way that the valve position can be adjusted;

wherein the damping system has a control/regulation device which is connected to the pump and the valves and is designed in such a way that it controls/regulates the valve position of the valves and/or the volumetric flow rate and/or the speed of the pump depending on a predetermined force setpoint acting on the piston rod;

wherein the control/regulation device is designed to determine the force actually acting on the piston rod and wherein the control/regulation device is designed to determine a force deviation between the force setpoint and the force actually acting on the piston rod and to control/regulate the valve position of the valves and/or the volumetric flow rate and/or the speed of the pump depending on the determined force deviation, wherein the pressure adjustment arrangement contains at least one sensor for determining the valve position and/or the voltage and/or current applied to the valves and wherein the sensor is connected to the control/regulation device and this is designed to determine the force actually acting on the piston rod from the data transmitted by the sensor.

8. The damping system as claimed in claim 7, wherein the pressure adjustment arrangement contains a sensor for determining the voltage, current applied to the pump, the volumetric flow rate and/or speed of the pump and wherein the sensor is connected to the control/regulation device and this is designed to determine the force actually acting on the piston rod from the data determined by the sensor.

9. The damping system as claimed in claim 7, wherein the control/regulation device contains a pump model that includes a pump pressure over a working range of the pump and wherein the control/regulation device is designed to determine the force actually acting on the piston rod from the pump model.

10. The damping system as claimed in claim 9, wherein the pressure adjustment arrangement contains a sensor for determining an acceleration and/or level of a vibration damper, which is connected to the control/regulation device and wherein the control/regulation device is designed in such a way that it calculates a correction factor for correcting the pump model from values determined by the sensor.

11. The damping system as claimed in claim 7, wherein the valves are designed in such a way that the valve position can be continuously adjusted.

12. A motor vehicle, comprising a damping system as claimed in claim 7.

* * * * *